United States Patent
Ash et al.

(10) Patent No.: US 7,171,610 B2
(45) Date of Patent: Jan. 30, 2007

(54) METHOD, SYSTEM, AND ARTICLE OF MANUFACTURE FOR PREVENTING DATA LOSS

(75) Inventors: Kevin John Ash, Tucson, AZ (US); Michael Thomas Benhase, Tucson, AZ (US); Carol Santich Mellgren, Tucson, AZ (US); Brian Anthony Rinaldi, Tucson, AZ (US); Kenneth Wayne Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 10/170,666

(22) Filed: Jun. 12, 2002

(65) Prior Publication Data

US 2003/0233613 A1    Dec. 18, 2003

(51) Int. Cl.
*G06F 11/26* (2006.01)
*G06F 11/36* (2006.01)

(52) U.S. Cl. .................... 714/799; 714/718
(58) Field of Classification Search ........... 714/799, 714/6, 100, 746, 718, 5, 25, 42, 48, 30; 360/53; 365/201, 185.08, 185.25; 369/30.21
See application file for complete search history.

(56) References Cited

U.S. PATENT DOCUMENTS

| | | | |
|---|---|---|---|
| 5,111,457 A * | 5/1992 | Rabjohns et al. ............ 714/6 |
| 5,404,500 A * | 4/1995 | Legvold et al. ............. 714/6 |
| 5,446,690 A * | 8/1995 | Tanaka et al. ......... 365/185.25 |
| 5,636,359 A | 6/1997 | Beardsley et al. |
| 5,828,599 A * | 10/1998 | Herdt ................. 365/185.08 |
| 5,928,367 A | 7/1999 | Nelson et al. |
| 5,978,952 A | 11/1999 | Hayek et al. |
| 6,006,342 A | 12/1999 | Beardsley et al. |
| 6,101,614 A | 8/2000 | Gonzales et al. |
| 6,122,756 A * | 9/2000 | Baxter et al. ............... 714/30 |
| 6,141,731 A | 10/2000 | Beardsley et al. |
| 6,772,376 B1 * | 8/2004 | Merkin et al. ............. 714/48 |
| 6,845,476 B2 * | 1/2005 | Chen ........................ 714/718 |

FOREIGN PATENT DOCUMENTS

JP    04215156 A  *  8/1992

\* cited by examiner

*Primary Examiner*—Guy Lamarre
*Assistant Examiner*—Dipakkumar Gandhi
(74) *Attorney, Agent, or Firm*—Rabindranath Dutta; Konrad Raynes & Victor LLP (57) ABSTRACT

Provided are a method, system, and an article of manufacture for preventing data loss. Modified data is stored in a volatile storage. The stored modified data is copied onto a non-volatile storage. A determination is made as to whether the non-volatile storage should be checked for errors. In certain implementations, on determining that the nonvolatile storage should be checked for errors the non-volatile storage is checked for errors. If on checking the non-volatile storage is found to have an error, an indication of the error is provided.

39 Claims, 5 Drawing Sheets

METHOD, SYSTEM, AND ARTICLE OF MANUFACTURE FOR PREVENTING DATA LOSS

BACKGROUND OF THE INVENTION

1. Field of the Invention

The present invention relates to a method, system, and an article of manufacture for preventing data loss.

2. Description of the Related Art

A storage subsystem, such as the International Business Machines ("IBM") Enterprise Storage Server ("ESS")**, receives Input/Output (I/O) requests directed toward an attached storage system. The attached storage system may comprise an enclosure including numerous interconnected disk drives, such as a Direct Access Storage Device (DASD), Redundant Array of Independent Disks (RAID Array), Just a Bunch of Disks (JBOD), etc.

I/O requests received by the storage subsystem include read requests to read data from a track and write requests to modify a track by writing data to the track. When the storage subsystem receives a write request, the storage subsystem stores the modified track in a cache, which may comprise one or more gigabytes of volatile storage, e.g., Random Access Memory (RAM), Dynamic Random Access Memory (DRAM), etc. Data stored in the cache may be lost under various situations, such as in the event of a loss of power supply to the volatile storage comprising the cache.

The cache can satisfy requests faster than the attached storage system. Hence, I/O requests can be satisfied faster if frequently accessed tracks are kept in the cache. In response to a read request, if a track is absent in the cache, the storage subsystem stages the track from the attached storage to the cache and satisfies the read request from the cache. However, since the capacity of the cache is relatively small when compared to the capacity of the attached storage system, the storage subsystem also discards tracks from the cache after first destaging the tracks that are modified. For example, when a cache is full discarding may be necessary before writing a new track to the cache or staging a track to the cache. The storage subsystem may discard tracks in a variety of ways, such as by discarding least recently used tracks or by discarding tracks by scanning the cache at periodic intervals.

While satisfying write requests, in addition to storing the modified tracks in the cache, the storage subsystem may also store a copy of the modified tracks in a nonvolatile storage unit (NVS), such as a battery backed-up volatile memory, to provide additional protection to the modified tracks in the event of a failure at the storage subsystem. Such failures may include a loss of power, resulting in a loss of the modified tracks from the volatile storage comprising the cache.

The storage subsystem stores the copy of the modified track in the NVS after the modified track has been stored in the cache, i.e., after committing the write request the second copy of the track is stored in the NVS. Hence, the NVS holds a second copy of the modified data after committing the write, but before destaging the data from the cache to the attached storage system. If the modified data were to be lost or corrupted in the cache before being destaged then the modified data could still be recovered from the NVS. The recovered data could then be destaged to the attached storage, thereby recovering from data loss or data corruption.

Notwithstanding the use of the NVS to reduce data errors in storage subsystems, there is a need in the art for improved techniques for still further reductions of data errors in storage subsystems.

SUMMARY OF THE PREFERRED EMBODIMENTS

Provided are a method, system, and an article of manufacture for preventing data loss. Modified data is stored in a volatile storage. The stored modified data is copied onto a non-volatile storage. A determination is made as to whether the non-volatile storage should be checked for errors. In certain implementations, on determining that the nonvolatile storage should be checked for errors the non-volatile storage is checked for errors. If on checking the non-volatile storage is found to have an error, an indication of the error is provided.

In further implementations, if the number of errors aggregated over time exceeds a predetermined threshold, additional tests are performed to isolate a component responsible for the errors exceeding the predetermined threshold. In still further implementations, the stored modified data is destaged from the volatile storage to a storage system prior to determining whether the non-volatile storage should be checked for errors. In certain implementations, whether the non-volatile storage should be checked for errors is determined after a predetermined plurality of destages from the volatile storage.

The implementations reduce the possibility of data errors in a storage subsystem by periodically checking a non-volatile storage within the storage subsystem for data errors. Further, the implementations allow for the detection and repair of the non-volatile storage and other hardware units before the non-volatile storage is called upon to provide recovery for lost modified data.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
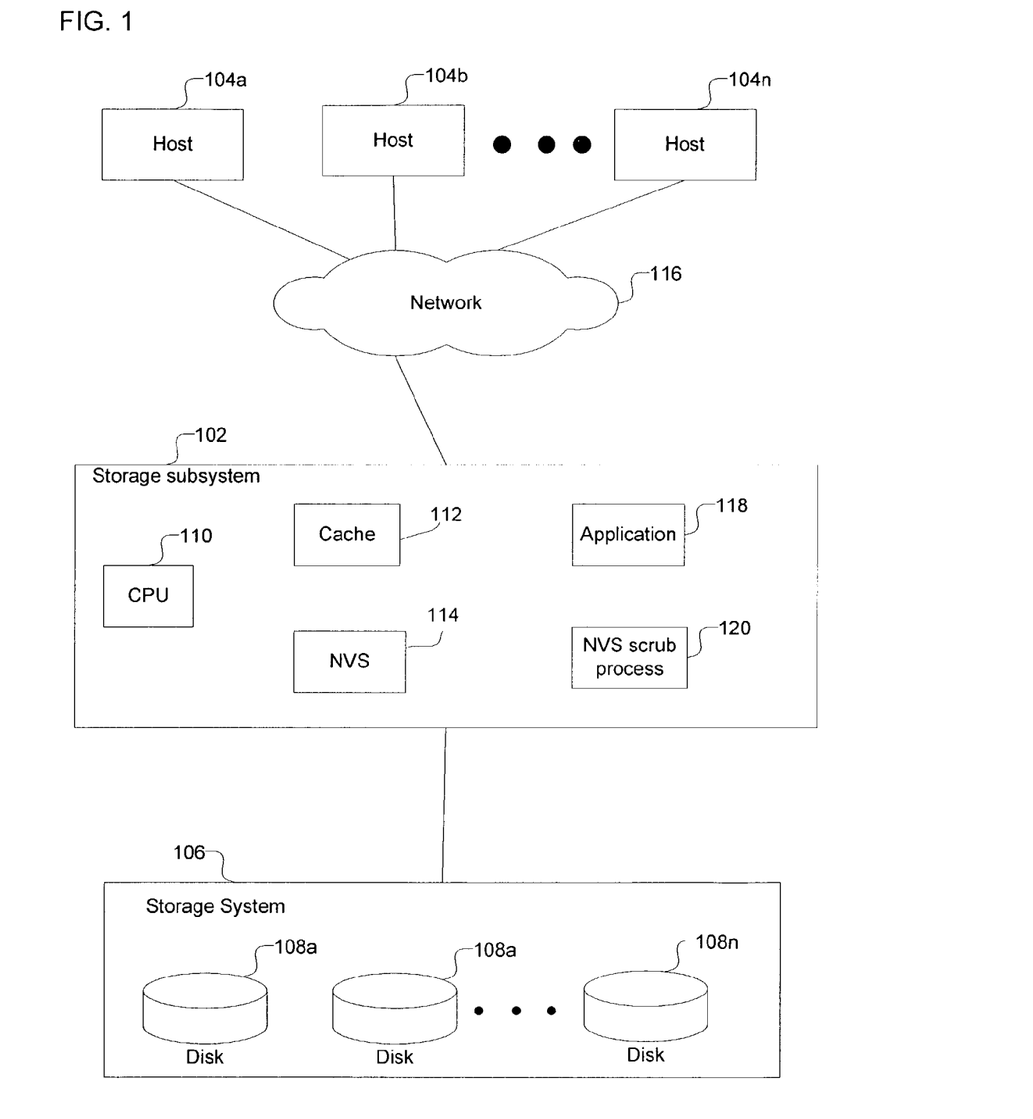
FIG. 1 illustrates a block diagram of a computing environment in which certain described aspects of the invention are implemented.

FIG. 1 illustrates a computing environment in which aspects of the invention are implemented. A caching storage controller, such as a storage subsystem 102, receives I/O requests from hosts 104a, 104b. . . 104n directed to tracks in a storage system 106, which comprises one or more hard disk drives 108a, 108b. . . 108n. The storage system 106 and the disk drives 108a, 108b. . . 108n may be configured as a DASD, one or more RAID ranks, Just a bunch of disks (JBOD), etc. The storage subsystem 102 further includes at least one central processing unit (CPU) 110, a cache 112 comprising a volatile memory to store tracks, and a non-volatile storage unit (NVS) 114 in which certain dirty or modified tracks in the cache 112 are buffered. The hosts 104a, 104b. . . 104n communicate I/O requests to the storage subsystem 102 via a network 116, which may comprise any network known in the art, such as a Storage Area Network (SAN), Local Area Network (LAN), Wide Area Network (WAN), the Internet, an Intranet, etc. The cache 112 may be implemented in one or more volatile memory devices and the NVS 114 may be implemented in one or more high-speed non-volatile storage devices, such as a battery backed up volatile memory.

An application 118, comprising either a hardware component or a process executed by the CPU 110, manages the NVS 114. In certain alternative implementations, the application 118 may be part of other processes in the storage subsystem 102. An NVS scrub process 120, comprising either a hardware component or a process executed by the CPU 110, checks the NVS 114 for data errors. In certain implementations, the NVS scrub process 120 may examine the data corresponding to a track stored on the NVS 114 for data errors, such as cyclic redundancy check (CRC) errors. In certain alternative implementations, the NVS scrub process 120 may be part of other processes in the storage subsystem 102. In other alternative implementations, the NVS scrub process 120 may be a part of the application 118. Other processes such as those for general management of the cache 112, for staging operations to the cache 112 are not shown in FIG. 1.

Figure 2:
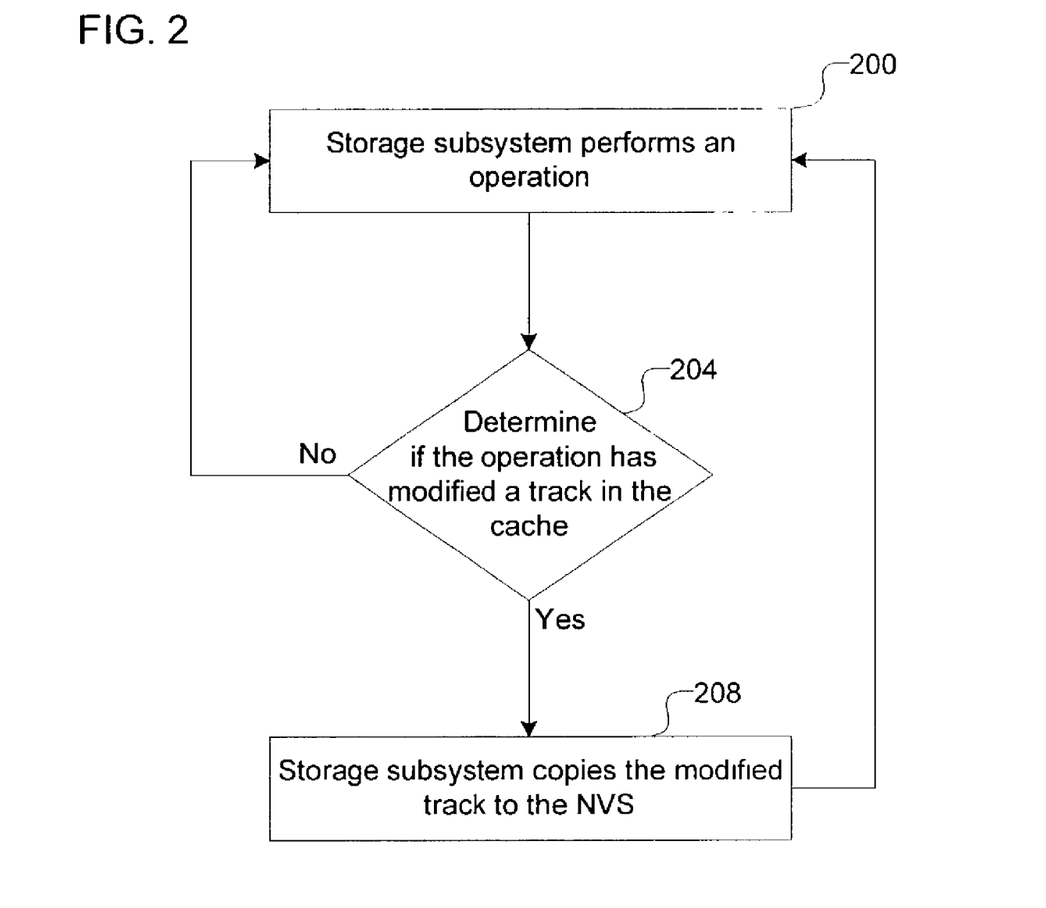
FIG. 2 illustrates logic implemented in a storage subsystem to store copies of modified tracks in an NVS, in accordance with certain described implementations of the invention.

FIG. 2 illustrates logic implemented in the storage subsystem 102 to store copies of modified tracks in the NVS 114, in accordance with certain implementations of the invention. The logic may be performed by the application 118 or by any other process within the storage subsystem 102. At block 200, the storage subsystem 102 performs an operation. The operation may include, satisfying from the cache 112 a read request generated by any of the hosts 104a. . . 104n, modifying a track in the cache 112 in response to a write request from any of the hosts 104a. . . 1104n, etc.

Control proceeds to block 204, where the storage subsystem 102 determines whether the operation has modified a track in the cache 112. If so, control proceeds to block 208, where the storage subsystem 102 copies the modified track to the NVS 114. The logic of blocks 204 and 208 may be performed immediately after the execution of the logic of block 200. If a significant period of time elapses between the end of execution of block 200 and the start of execution of block 208, errors may be introduced if the modified track in the cache 112 changes or is otherwise lost during the elapsed time. At the conclusion of block 208, control proceeds to block 200 where the storage subsystem 102 performs the next operation.

If at block 204, the storage subsystem 102 determines that the operation has not modified a track in the cache 112, then control proceeds to block 200 where the storage subsystem 102 performs the next operation.

The logic of FIG. 2 stores a modified track in the NVS 114 only after the modified track has been stored in the cache 112, i.e., the storage subsystem 102 stores a second copy of the modified track in the NVS 114 only after committing the write request. Hence, the NVS 114 holds a second copy of the modified data after the storage subsystem 102 has committed the write request corresponding to the modified data.

Figure 3:
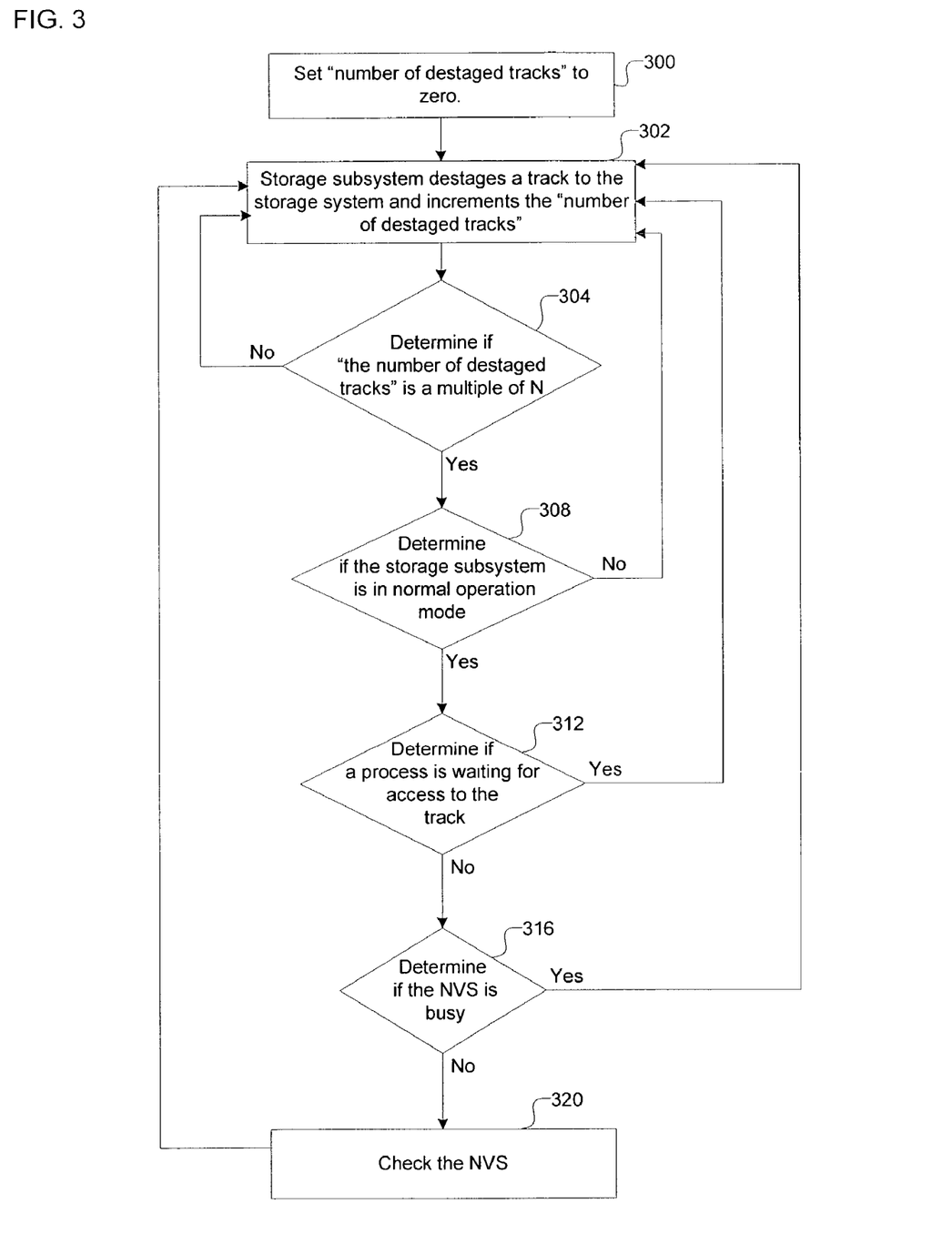
FIG. 3 illustrates logic implemented in a storage subsystem to determine when to scrub an NVS, in accordance with certain described implementations of the invention.

FIG. 3 illustrates logic implemented in the storage subsystem 102 to determine when to check for errors in the NVS 114 with the NVS scrub process 120, in accordance with certain implementations of the invention. Control begins at block 300, where the application 118 assigns a variable named "number of destaged tracks", to be zero. Control proceeds to block 302, where the storage subsystem 102 destages a track to the storage system 106 and increments the "number of destaged tracks" by one. The storage subsystem 102 destages tracks to the disks 108a. . . 108n of the storage system 106 via a background process, where the background process executes when other processes within the storage subsystem 102 are mostly idle.

Control proceeds to block 304 where the application 118 determines whether the "number of destaged tracks" is a multiple of N, where N is an integer determined by performance tests conducted on the storage subsystem 102 prior to the execution of the logic of FIG. 3. The number N is sufficiently high such that the performance impact on the storage subsystem 102 of checking the NVS 114 with the NVS scrub process 120 at every $N^{th}$ destaged track is small. In certain alternative implementations every time a track is destaged to the storage system 106 the NVS 114 could be checked for data errors. However, checking the NVS 114 more frequently increases the processing load on the storage subsystem 102. If at block 304, the application 118 determines that the destaged track is not the $N^{th}$ destaged track, then control proceeds back to block 302.

If at block 304 the application 118 determines that the number of destaged tracks is a multiple of N, control proceeds to block 308 where the application 118 determines whether the storage subsystem 102 is in normal operation mode. It is undesirable to commence checking the NVS 114 when the storage subsystem is not in a normal operation mode, such as during a startup, shutdown or failure recovery phase. Different implementations may have different normal operation modes. If at block 308, the application 118 determines that the storage subsystem 102 is in normal operation mode control proceeds to block 312. Otherwise, control proceeds back to block 302.

At block 312, the application 118 determines whether any process is waiting for access to the track that was destaged in block 302. If so, checking the NVS 114 would degrade the performance of the storage subsystem 102 because the waiting process may have to wait for a further period of time while the NVS 114 is checked. Hence, control proceeds back to block 302 when any process is waiting for access to the track that was destaged in block 302. If at block 312 the application 118 determines that no process is waiting for access to the track, control proceeds to block 316 where the application 118 determines if the NVS 114 is busy. If the NVS 114 is busy control proceeds back to block 302. If the NVS 114 is not busy, then control proceeds to block 320, where the application 118 requests the NVS scan process 120 to check the NVS 114. The logic for checking the NVS 114 will be described in FIG. 4. At the conclusion of block 320, i.e., after the NVS 114 has been checked, control proceeds back to block 302.

The logic of FIG. 3 requests the NVS scrub process 120 to check the NVS 114 at a time when the likelihood of performance degradation of the storage subsystem 102 is insignificant as determined by the application 118. The logic of FIG. 3 describes certain implementations to limit the frequency of running the NVS scrub process 120 based on certain factors, such as, the frequency of destage operations. Other factors, such as, the amount of elapsed time, could also be used to limit the frequency of running the NVS scrub process 120.

Figure 4:
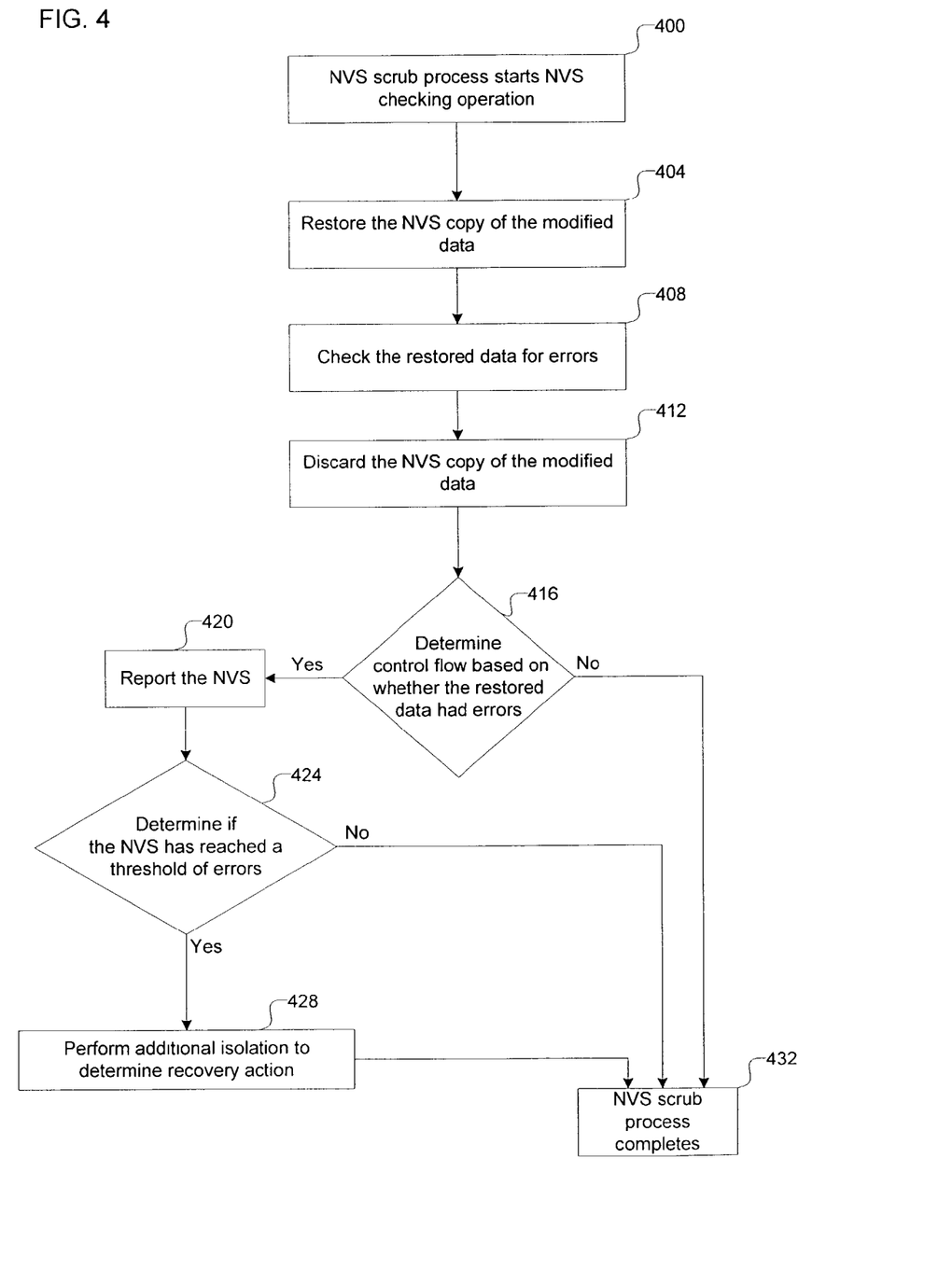
FIG. 4 illustrates logic implemented in a storage subsystem that scrubs an NVS, in accordance with certain described implementations of the invention.

FIG. 4 illustrates logic implemented in a storage subsystem 102 that checks the NVS 114, in accordance with certain implementations of the invention. At block 400, the NVS scrub process 120 starts the NVS checking operation (the NVS scrub process 120 was initiated in block 320 of FIG. 3). Control proceeds to block 404, where the NVS scrub process 120 restores the NVS copy of the modified data. The restoration of the modified data is from the NVS 114. The NVS scrub process 120 then checks (at block 408) the restored data for errors. The data error checking may involve logical redundancy checks (LRC), cyclic redundancy checks (CRC), physical address (PA) checks or any other data error checking mechanisms known in the art. After block 408, the NVS scrub process 120 discards (at block 412) the NVS copy of the modified data.

Control proceeds to block 416, where the NVS scrub process 120 makes a decision on control flow based on the determination for errors that had been performed earlier in block 408. If errors had been determined earlier in block 408, control proceeds from block 416 to block 420 where the NVS scrub process 120 reports information on the errors in the NVS 114 to a user or administrator of the storage subsystem 102. The reporting may indicate the precise nature of the data error, e.g., the reporting may state that at a certain physical address on the NVS 114 there was a CRC error in the data corresponding to a certain track. Control proceeds to block 424, where the NVS scrub process 120 determines whether the NVS 114 has reached a predetermined threshold of errors. In certain implementations the total number of errors accumulated over a period of time is compared to the predetermined threshold of errors corresponding to the same period of time. In another implementation the total number of errors accumulated during a number of destages is compared to the predetermined threshold of errors corresponding to the same number of destages. The predetermined threshold of errors may be determined experimentally or otherwise for the NVS 114 in any manner known in the art prior to the execution of the logic of FIG. 4. If the NVS 114 has reached the predetermined threshold of errors, there is a likelihood of potential future errors in the NVS 114 that may lead to a loss of data. Control proceeds to block 428 where the NVS scrub process 120, in association with other processes in the storage subsystem 102, performs additional isolations to determine a plan of recovery for reducing data errors. Such additional isolations may include the replacement of a series of components and attempts to determine which of the components was causing the data errors. For example, the NVS 114 or other components such as host bus adapters connecting the storage subsystem 102 to the hosts 104a... 104n could be individually replaced and the defective component isolated.

After the component is isolated the NVS scrub process 120 completes (at block 432). In alternative implementations, the isolations may be made offline after the NVS scrub process 120 completes.

If at block 424, the NVS scrub process 120 determines that the NVS 114 has not reached a predetermined threshold level of errors, then control proceeds to block 432 where the NVS scrub process 120 completes. Also, from block 416 the control flow logic proceeds to block 432 if the NVS scrub process 120 had determined earlier, at block 408, that the restored data had no errors. At block 432 the NVS scrub process 120 completes.

The logic of FIG. 4 checks the NVS 114 for data errors. If the number of data errors accumulated over time reaches a certain predetermined threshold the NVS scrub process 120 performs additional tests to isolate the component causing the errors.

In the described implementations, the NVS 114 holds a second copy of the modified data after the storage subsystem 102 has committed write requests, but before the storage subsystem 102 has destaged the modified data from the cache 112 to the attached storage system 106. If the modified data were to be lost or corrupted in the cache 112 prior to being destaged, the modified data could still be recovered from the NVS 114. The recovered data could then be destaged to the attached storage system 106, thereby recovering from data loss or data corruption. Although, the NVS 114 is not called upon very often to provide a copy of the modified data, it is expected that when the NVS 114 does provide a copy of the modified data that copy would not contain any data errors. The cause of the data errors may be a defective NVS 114, a corruption while transferring data into or recovering data from the NVS 114, data overlaid during some other transfer or some other failure. In many instances, the NVS 114 is constructed from off-the-shelf generic parts and such off-the-shelf generic parts may be susceptible to errors, especially at a rate that is not acceptable in high performance and high availability systems. The implementations reduce the possibility of data errors in the storage subsystem 102 by periodically checking the NVS 114 for data errors.

Since errors in the NVS 114 are infrequent, it is possible for the NVS 114 to become defective long before the storage subsystem 102 detects the defect. The implementations allow for the detection and repair of the NVS 114 and other hardware units before the NVS 114 is called upon to provide recovery for lost modified data for which the volatile copy is lost. The implementations thereby prevent the loss of data.

The described implementations check the NVS 114 without substantially degrading or the overall performance of the storage subsystem 102 by limiting the frequency of the NVS checking operations to once every N (where N is a sufficiently high integer) destaged tracks.

ADDITIONAL IMPLEMENTATION DETAILS

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and nonvolatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 5:
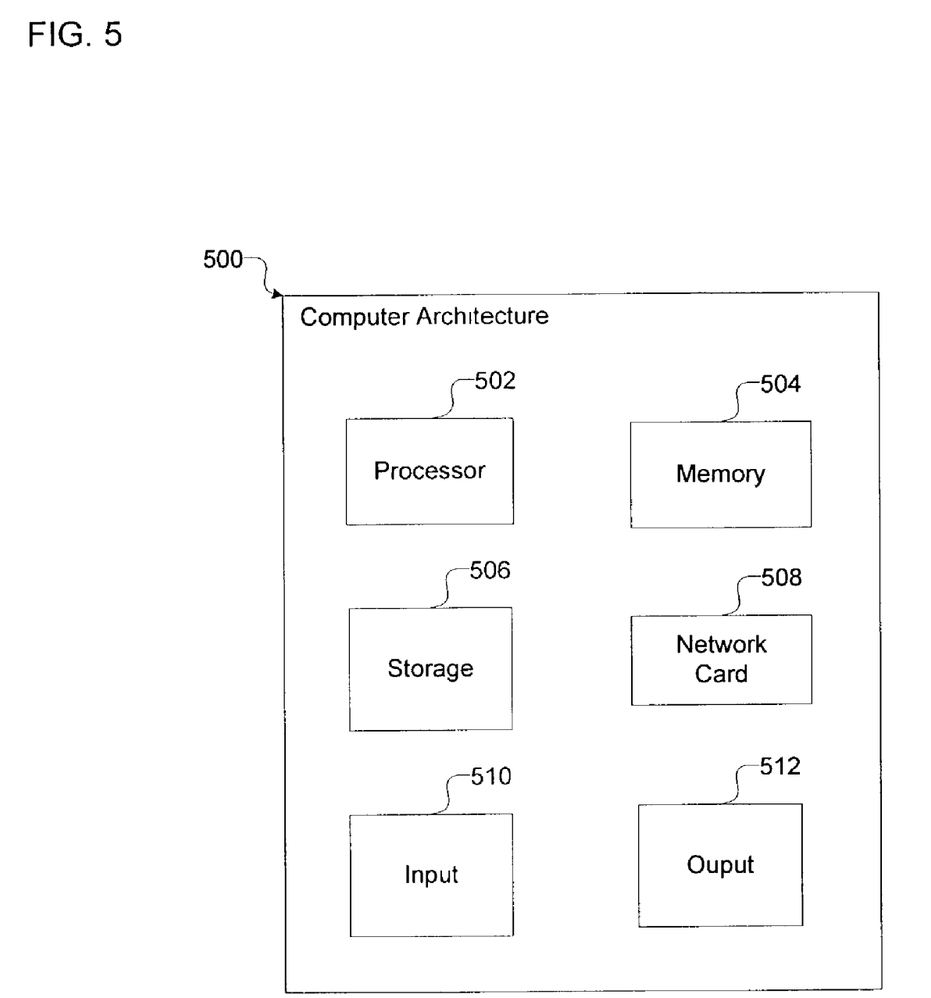
FIG. 5 illustrates a block diagram of a computer architecture in which certain described aspects of the invention are implemented.

FIG. 5 illustrates a block diagram of a computer architecture in which certain aspects of the invention are implemented. FIG. 5 illustrates one implementation of the hosts 104a ... 104n and the storage subsystem 102. These systems 104a ... 104n, 102 may implement a computer architecture 500 having a processor 502 (e.g., a microprocessor, the CPU 110, etc.), a memory 504 (e.g., a volatile memory device), and storage 506 (e.g., a non-volatile storage, magnetic disk drives, optical disk drives, tape drives, etc.). In the storage subsystem 102, the cache 112 and the NVS 114 may be present in addition to the memory 504. The storage 506 may comprise an internal storage device or an attached or network accessible storage. Programs in the storage 506 may be loaded into the memory 504 and executed by the processor 502 in a manner known in the art. The architecture may further include a network card 508 to enable communication with a network, such as network 116. The architecture may also include at least one input 510, such as a keyboard, a touchscreen, a pen, voice-activated input, etc., and at least one output 512, such as a display device, a speaker, printer, etc.

The implementations of FIGS. 2 to 4 describe specific operations occurring in a particular order. Further, the steps may be performed in parallel as well as sequentially. In alternative implementations, certain of the logic operations may be performed in a different order, modified or removed and still implement preferred embodiments of the present invention. Morever, steps may be added to the above described logic and still conform to the preferred embodiments. Yet further steps may be performed by a single process or distributed processes.

While the hosts 104a ... 104n and the storage subsystem 102 communicate within a client-server paradigm in the described implementations, they may also communicate within a peer-to-peer or any other paradigm known in the art. Furthermore, many of the software and hardware components have been described in separate modules for purposes of illustration. Such components may be integrated into a fewer number of components or divided into a larger number of components. Certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for preventing data loss, the method comprising:
    storing modified data in a volatile storage;
    copying the stored modified data into a non-volatile storage; and
    determining, while the volatile storage is operational, whether the non-volatile storage should be checked for errors after a predetermined plurality of destages for the volatile storage.

2. The method of claim 1, further comprising:
    on determining that the non-volatile storage should be checked for errors, checking the non-volatile storage for the errors; and
    if the non-volatile storage is found to have an error during checking, reporting the error.

3. The method of claim 2, further comprising:
    if the number of errors aggregated over time exceeds a predetermined threshold, performing additional tests to isolate a component responsible for the errors exceeding the predetermined threshold.

4. The method of claim 1, wherein determining whether the non-volatile storage should be checked for errors further comprises determining whether a storage subsystem comprising the volatile storage and the non-volatile storage is operating normally.

5. The method of claim 1, wherein the volatile storage is coupled to a plurality of hosts and a storage system, wherein the input and output requests from the hosts are satisfied by staging data into the volatile storage from the storage system and destaging data from the volatile storage to the storage system.

6. The method of claim 1, wherein the errors are data errors, wherein the non-volatile storage is checked for errors while a storage subsystem that includes the volatile storage and the non-volatile storage is in a normal operation mode.

7. A method for preventing data loss, the method comprising:
    storing modified data in a volatile storage;
    copying the stored modified data into a non-volatile storage; and
    determining, while the volatile storage is operational, whether the non-volatile storage should be checked for errors, wherein determining whether the non-volatile storage should be checked for errors further comprises determining whether the non-volatile storage is busy.

8. The method of claim 7, further comprising:
    destaging the stored modified data from the volatile storage to a storage system prior to determining whether the non-volatile storage should be checked for errors.

9. The method of claim 7, wherein determining whether the non-volatile storage should be checked for errors further comprises determining whether a track corresponding to the stored modified data is destaged.

10. The method of claim 7, wherein determining whether the non-volatile storage should be checked for errors further comprises determining whether a process on a storage subsystem comprising the volatile storage and the non-volatile storage is waiting for access to a track corresponding to the stored modified data.

11. The method of claim 7, further comprising:
on determining that the non-volatile storage should be checked for errors, restoring the modified data to the volatile storage;
determining whether the restored data has errors.

12. The method of claim 7, wherein the volatile storage comprises a cache, wherein the volatile storage arid the non-volatile storage comprise a storage subsystem, wherein the storage subsystem is coupled to a storage system, end further comprising:
destaging the modified data from the volatile storage to the storage system.

13. The method of claim 7, wherein the errors are data errors, wherein the non-volatile storage is checked for errors while a storage subsystem that includes the volatile storage and the non-volatile storage is in a normal operation mode.

14. A system for preventing data loss, the system comprising:
a volatile storage;
a non-volatile storage;
means for storing modified data in the volatile storage;
means for copying the stored modified data into the non-volatile storage, and
means for determining, while the volatile storage is operational, whether the non-volatile storage should be checked for errors after a predetermined plurality of destages from the volatile storage.

15. The system of claim 14, further comprising:
means for checking the non-volatile storage for the errors on determining that the non-volatile storage should be checked for errors; and
means for reporting an error if the non-volatile storage is found to have the error during checking.

16. The system of claim 15, further comprising:
means for performing additional tests to isolate a component responsible for the errors exceeding a predetermined threshold, if the number of errors aggregated over time exceeds the predetermined threshold.

17. The system of claim 14, wherein the means for determining whether the non-volatile storage should be checked for errors further determines whether a storage subsystem comprising the volatile storage and the non-volatile storage is operating normally.

18. The system of claim 14, wherein the volatile storage is coupled to a plurality of hosts and a storage system, wherein the input and output requests from the hosts are satisfied by staging data, into the volatile storage from the storage system and destaging data from the volatile storage to the storage system.

19. The system of claim 14, wherein the errors are data errors, wherein the non-volatile storage is checked for errors while a storage subsystem that includes the volatile storage and the non-volatile storage is in a normal operation mode.

20. A system for preventing data loss, the system comprising:
a volatile storage;
a non-volatile storage;
means for storing modified data in the volatile storage;
means for copying the stored modified data into the non-volatile storage; and
means for determining, while the volatile storage is operational, whether the non-volatile storage should be checked for errors, wherein the means for determining whether the non-volatile storage should be checked for errors further determines whether the non-volatile storage is busy.

21. The system of claim 20, further comprising:
means For destaging the stored modified data from the volatile storage to a storage system prior to determining whether the non-volatile storage should be checked for errors.

22. The system of claim 20, wherein the means determining whether the non-volatile storage should be checked for errors further determines whether a track corresponding to the stored modified data is destaged.

23. The system of claim 20, wherein the means for determining whether the non-volatile storage should be checked for errors further determines whether a process on a storage subsystem comprising the volatile storage and the non-volatile storage is waiting for access to a track corresponding to the stored modified data.

24. The system of claim 20, further comprising:
means for restoring the modified data to the volatile storage on determining that the non-volatile storage should be checked for errors;
means for determining whether the restored data has errors.

25. The system of claim 20, wherein the volatile storage comprises a cache, wherein the volatile storage and the non-volatile storage comprise a storage subsystem, wherein the storage subsystem is coupled to a storage system, and further comprising:
means for destaging the modified data from the volatile storage to the storage system.

26. The system of claim 20, wherein the errors are data errors, wherein the non-volatile storage is checked for errors while a storage subsystem that includes the volatile storage arid the non-volatile storage is in a normal operation mode.

27. An article of manufacture for preventing data loss, wherein the article of manufacture causes operations, the operations comprising:
storing modified data in a volatile storage;
copying the stored modified data into a non-volatile storage; and
determining, while the volatile storage is operational, whether the non-volatile storage should be checked for errors after a predetermined plurality of destages from the volatile storage.

28. The article of manufacture of claim 27, the operations further comprising:
on determining that the non-volatile storage should be checked for errors, checking the non-volatile storage for the errors; and
if the non-volatile storage is found to have an error during checking, reporting the error.

29. The article of manufacture of claim 28, the operations further comprising:
if the number of errors aggregated over time exceeds a predetermined threshold, performing additional tests to isolate a component responsible for the errors exceeding the predetermined threshold.

30. The article of manufacture of claim 27, wherein determining whether the non-volatile storage should be checked for errors further comprises determining whether a storage subsystem comprising the volatile storage and the non-volatile storage is operating normally.

31. The article of manufacture of claim 27, wherein the volatile storage is coupled to a plurality of hosts and a storage system, wherein the input and output requests from the hosts are satisfied by staging data into the volatile storage from the storage system and destaging data from the volatile storage to the storage system.

32. The system of claim 27, wherein the errors are data errors, wherein the non-volatile storage is checked for errors while a storage subsystem that includes the volatile storage and the non-volatile storage is in a normal operation mode.

33. An article of manufacture for preventing data loss, wherein the article of manufacture causes operations, the operations comprising:
    storing modified data in a volatile storage;
    copying the stored modified data into a non-volatile storage; and
    determining, while the volatile storage is operational, whether the non-volatile storage should be checked for errors, wherein determining whether the non-volatile storage should be checked for errors further comprises determining whether the non-volatile storage is busy.

34. The article of manufacture of claim 33, the operations further comprising:
    destaging the stored modified data from the volatile storage to a storage system prior to determining whether the non-volatile storage should be checked for errors.

35. The article of manufacture of claim 33, wherein determining whether the non-volatile storage should be checked for errors further comprises determining whether a track corresponding to the stored modified data is destaged.

36. The article of manufacture of claim 33, wherein determining whether the non-volatile storage should be checked for errors further comprises determining whether a process on a storage subsystem comprising the volatile storage and the non-volatile storage is waiting for access to a track corresponding to the stored modified data.

37. The article of manufacture of claim 33, the operations further comprising:
    on determining that the non-volatile storage should be checked for errors, restoring the modified data to the volatile storage;
    determining whether the restored data has errors.

38. The article of manufacture of claim 33, wherein the volatile storage comprises a cache, wherein the volatile storage and the non-volatile storage comprise a storage subsystem, wherein the storage subsystem is coupled to a storage system, and further comprising:
    destaging the modified data from the volatile storage to the storage system.

39. The system of claim 33, wherein the errors are data errors, wherein the non-volatile storage is checked for errors while a storage subsystem that includes the volatile storage and the non-volatile storage is in a normal operation mode.

* * * * *